United States Patent [19]

Fischer

[11] 4,337,553

[45] Jul. 6, 1982

[54] APPARATUS FOR GUIDING AND CLAMPING FLEXIBLE ROPES AND THE LIKE

[75] Inventor: Manfred Fischer, Berlin, Fed. Rep. of Germany

[73] Assignee: Geroh GmbH Mechanische Systeme, Waischenfeld, Fed. Rep. of Germany

[21] Appl. No.: 114,633

[22] Filed: Jan. 23, 1980

[30] Foreign Application Priority Data

Feb. 20, 1979 [DE] Fed. Rep. of Germany ....... 2906517

[51] Int. Cl.³ .............................................. B66D 3/00
[52] U.S. Cl. ................................. 24/68 R; 24/115 H; 24/136 K; 254/242; 254/256; 254/391
[58] Field of Search .............. 254/391, 395, 396, 208, 254/242, 246, 243, 247, 250, 251, 256, 261; 410/100; 24/136 K, 273, 68 R–68 SC, 69 R–69 WT, 70 ST, 70 CT, 71 CT, 71 ST, 71.1, 115 H; 188/65.4

[56] References Cited

U.S. PATENT DOCUMENTS

| 541,925 | 7/1895 | Emery | 24/71.1 |
|---|---|---|---|
| 1,442,396 | 1/1923 | Goetz | 24/68 R |
| 2,400,589 | 5/1946 | McArthur | 242/107.4 R |
| 2,557,499 | 6/1951 | Davis | 24/68 CD |
| 2,934,318 | 4/1960 | Schultz | 254/217 |
| 3,099,055 | 7/1963 | Huber | 24/68 CD X |

FOREIGN PATENT DOCUMENTS

| 64653 | 1/1892 | Fed. Rep. of Germany . |
|---|---|---|
| 48342 | 5/1947 | Fed. Rep. of Germany . |
| 48330 | 7/1955 | Fed. Rep. of Germany . |
| 2702113 | 7/1977 | Fed. Rep. of Germany . |
| 1684554 | 9/1978 | Fed. Rep. of Germany . |
| 255198 | 1/1949 | Switzerland ........................ 254/396 |

Primary Examiner—John M. Jillions
Attorney, Agent, or Firm—Mason, Kolehmainen, Rathburn & Wyss

[57] ABSTRACT

Apparatus for guiding and clamping an elongated flexible rope comprises a body supporting a plurality of rotatively mounted guide rollers aligned for guiding said rope in a plane. One of said guide rollers is mounted on said body adjacent a tension end of the rope and is selectively lockable against rotation. The other guide roller is mounted on said body adjacent a portion of the rope that is looped around for tension and is mounted for movement toward and away from said first guide roller so that rope passing around both guide rollers and extended between adjacent portions thereof may be pressed into a clamped position when the second guide roller is moved toward said first guide roller. The rope is released upon movement of the second roller in an opposite direction. Anchor means is provided for securing said body to pivot about a fixed point between a rope clamping position and a rope releasing position, and a hook element is provided for securing the body in the rope clamping position.

7 Claims, 10 Drawing Figures

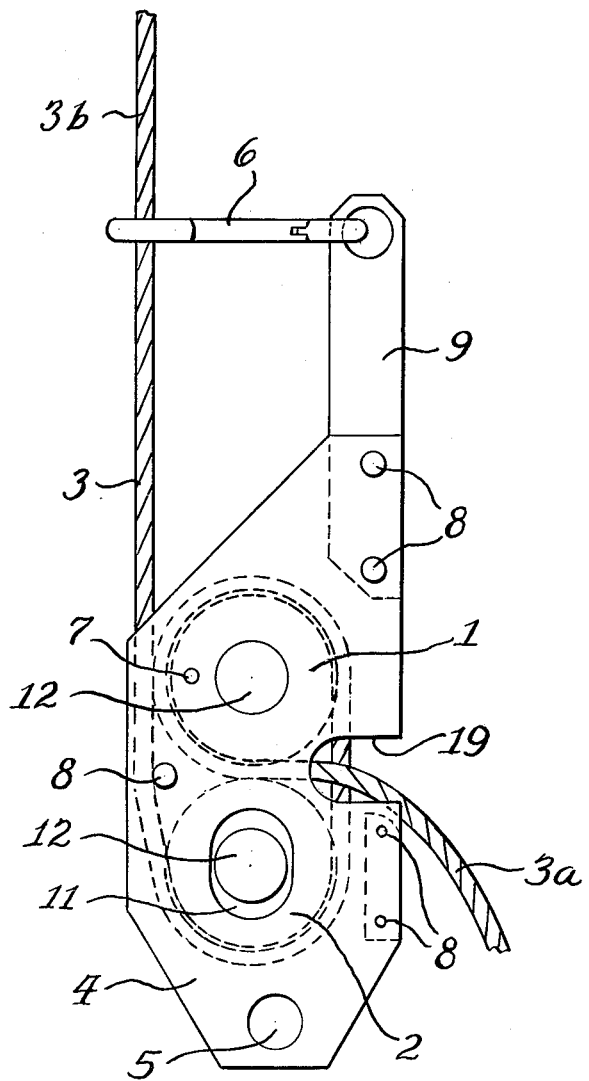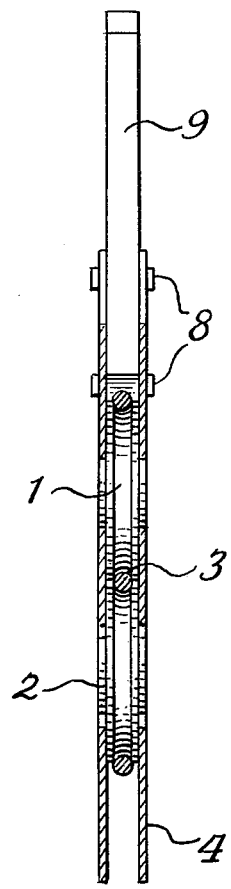
Fig. 1.
Fig. 2.

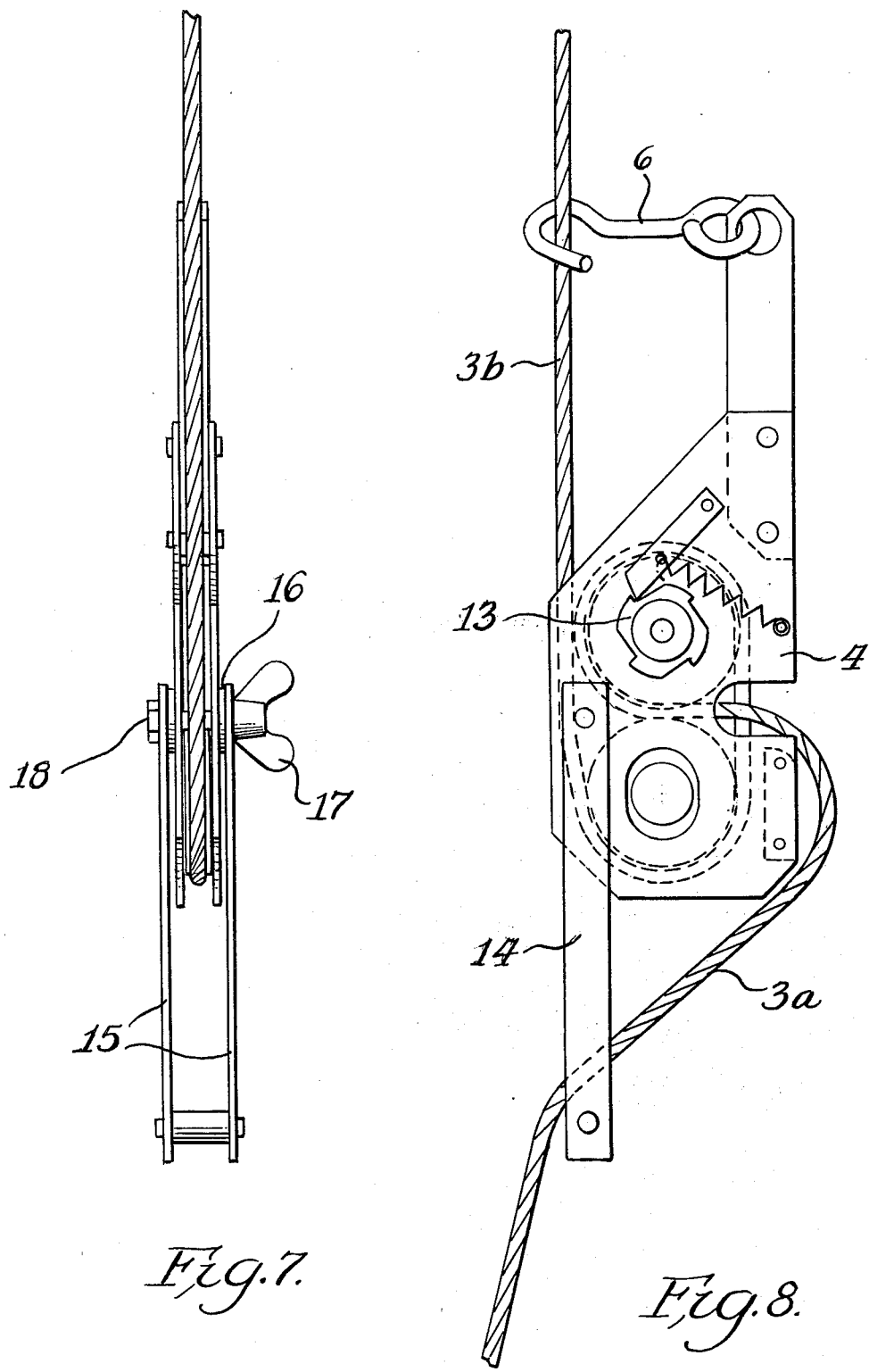

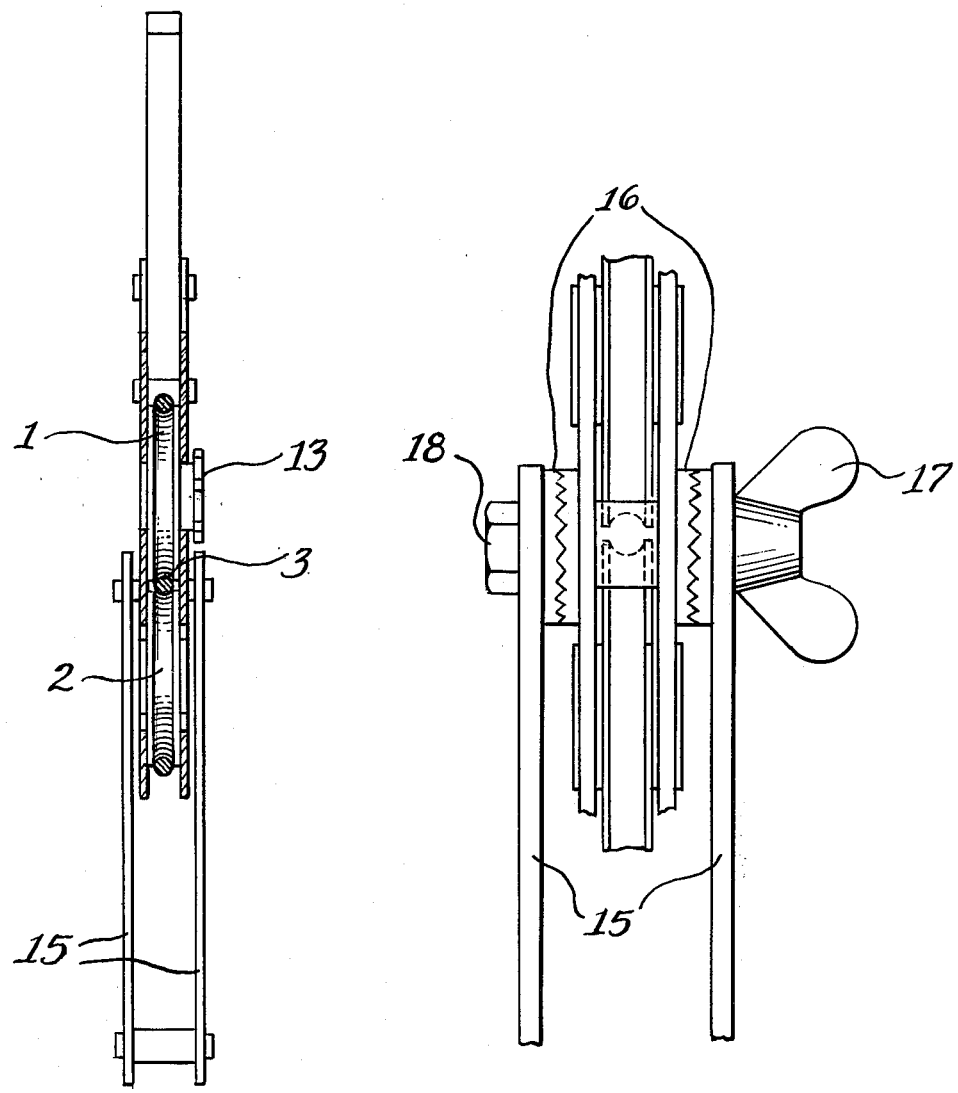

4,337,553

APPARATUS FOR GUIDING AND CLAMPING FLEXIBLE ROPES AND THE LIKE

BACKGROUND OF THE INVENTION

1. Field of the Invention

The present invention relates to an apparatus for the guiding and firmly clamping a flexible rope or cable, and includes a body and two guide rollers for the rope, aligned to guide the rope in a plane.

2. Description of the Prior Art

Usually, rope clamping installations which are provided with stationary jaws are used for firmly clamping ropes or cables. Typical jaw clamping units are described in the General Industrial Standardizations 48330 and 48342. Another rope clamping apparatus is described in the German Provisional Publication No. 27 02 113 wherein a rope leads through a body member provided with a slot and positioned for rotation, so that upon the rotation of the body, a clamping of the rope takes place. A rachet brake for ropes is shown in German Pat. No. 64 653 where a rope extends over two rope pulleys located in a lever and whereby the rope section located between the two pulleys is pressed against the housing during rope clamping.

OBJECTS OF THE PRESENT INVENTION

It is an object of the present invention to provide simple apparatus for the guiding and firmly clamping of a rope or cable without using stationary jaws for clamping of the rope or cable.

When ropes or cables are tensioned for supporting poles, for example, poles of movable antenna systems or tents, it is necessary to firmly clamp, either temporarily or permanently, the freely suspended cables after the tensioning is attained. In such applications, the rope or cable is present as a rule in a larger length than required ultimately after tensioning is completed. Following the installation and tensioning, the rope must be clamped or held firmly. Particularly with retractable antenna poles of mobile antenna systems which can be extended to different heights it is necessary to provide a tensioning rope of the length required and as a pole is extended, additional length of tensioning rope must be available. During this operation, the rope must be guided and tension maintained. Retractable or extendable antenna masts are described for example, in the German Display Copy No. 1,684,554, particularly in FIG. 1 of this printed publication, in which an extensible antenna pole with tensioning ropes is represented.

SUMMARY OF THE INVENTION

The foregoing and other objects and advantages of the present invention are accomplished by a new and improved apparatus for guiding and clamping an elongated flexible rope comprises a body supporting a plurality of rotatively mounted guide rollers aligned for guiding said rope in a plane. One of said guide rollers is mounted on said body adjacent one end of the rope and is selectively lockable against rotation. The other guide roller is mounted on said body adjacent a portion of the rope that is pulled to provide tension and is mounted for movement toward and away from said first guide roller so that rope passing around both guide rollers and extended between adjacent portions thereof may be pressed into a clamped position when the second guide roller is moved toward said first guide roller. The rope is released upon movement of the second roller in an opposite direction. Anchor means is provided for securing said body to pivot about a fixed point between a rope clamping position and a rope releasing position, and a hook element is provided for securing the body in the rope clamping position.

The apparatus according to the invention is useful with ropes of hemp, plastic materials or metal and in particular steel or wire rope. It also is possible to tension various types of wire with an apparatus according to the invention, and, for example, electric or telephone cables can be guided, tensioned and clamped under tension with the apparatus according to the invention. Apparatus of the invention is advantageous particularly when tensioning a cable extended between two poles because the cable at first is in a sagging condition because of a greater length than will be needed eventually when the cable is clamped firmly after adjustment to the right length between the poles. In such applications, the apparatus of the invention may be used for the temporary guiding and clamping of a cable and subsequently to permanently fasten the cable at the actual fastening point, for example, such as an insulator on the pole.

BRIEF DESCRIPTION OF THE DRAWINGS

For a better understanding of the present invention, reference should be had to the following detailed description taken in conjunction with the drawings, in which:

FIGS. 1 and 2 illustrate one embodiment of a cable guiding and clamping apparatus according to the invention in a plan view and in section in clamping position;

FIG. 5 illustrates the apparatus of FIG. 3 in position as the cable is being tightened;

FIGS. 6 and 7 show yet another embodiment of a cable guiding and clamping apparatus according to the invention in plan view and in section, similar to the apparatus shown in FIG. 3, but including a pivotal element for attaching the apparatus;

FIGS. 8 and 9 show still another embodiment of a cable guiding and clamping apparatus according to the invention in plan view and in section, similar to the apparatus of FIGS. 6 and 7 and including rachet means; and FIG. 10 is an enlarged fragmentary sectional view of a mechanism for securing the apparatus of FIGS. 6 and 7 in a selected pivotal position.

DESCRIPTION OF THE PREFERRED EMBODIMENTS

Figure 3:
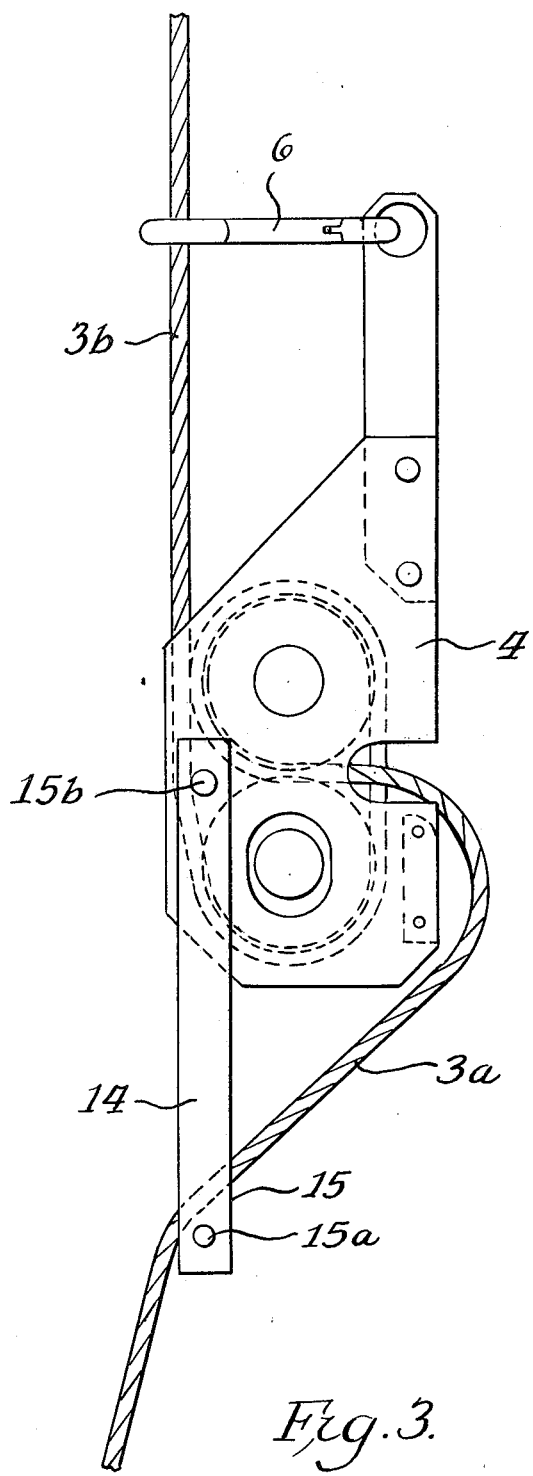
FIGS. 3 and 4 illustrate another embodiment of a cable guiding and clamping apparatus according to the invention in a plan view and in section in clamping position especially adapted for attachment to a fixed point.

Referring now more particularly to the drawings, in FIGS. 1 and 2 is illustrated one embodiment of a new and unique apparatus for guiding and clamping an elongated, flexible element 3 such as rope, line, wire, cable, etc. The apparatus includes a body 4 on which are mounted for rotation a pair of guide rollers 1 and 2 carried on shafts 12. The body includes a pair of side members of flat sheet material which are maintained in parallel, spaced apart relation to each other by one or more spacers or fasteners 8. Each side member is provided with a pair of holes to accommodate and support the shafts 12 of the guide rollers 1 and 2, and one of the holes 11 is shaped to be oblong in order to accommodate movement of the shaft 12 of the guide roller 2 toward and away from the guide roller 1. Preferably, the body 4 is formed of a pair of identical steel plates provided with corresponding perforations for the shafts and for the spacers or fasteners 8 which may comprise screws, rivets, bolts and the like to secure the plates together and form a housing for the guide rollers 1 and 2.

Each side member of the body 4 is provided with a cutout or slot 19 (FIG. 1) along one edge between the rollers to provide an area where the rope or cable 3 may be overlapped, as otherwise the distance between the pair of side plates of the body 4 may be too small for accommodating two thicknesses of the rope or cable, and thus, provide more positive guidance of the rope between the side members except in the cut out area 19. However, the distance or spacing between the side members may also be sufficiently large by increasing the length of the spacers 8 to be slightly larger than twice the diameter of the rope or cable 3 that is to be used.

The guide roller 1 is adapted to be restrained or locked against rotation by means of a bolt, or screw 7, etc. so that when desired, rotation of the guide roller 1 can be prevented.

The body 4 is adapted to be attached to a fixed point on a pole, anchor, structure, etc. associated with a cable or rope under tension. For example, a telescoping antenna mast, a tent pole, a tent peg fastened in the ground or other fixed member may provide a fixed support for the apparatus according to the invention which may be fastened thereto by means of openings 5 provided in the body 4. At the opposite end of the body side members, a hook or looped element 6 is provided to secure or fix the apparatus in a clamping position relative to the cable 3. The hook or fastening element 6 may comprise a spring safety hook which detachably embraces a portion 3b of the cable or rope 3 to prevent rotation of the body 4 in a clockwise direction around the hole 5 and thus maintains the tension already exerted on the rope or cable after tightening and locking the hook in place. The spring safety hook 6 is pivotally connected to a finger 9 that is secured to the body 4 by spacers 8.

In using the apparatus, the body 4 is secured to a fixed element or hook extended through the hole 5 and a portion of the rope 3b is guided through the hook 6 and then between the side members around the pulley 2 as shown. The rope is then guided around the pulley 1 and the free end portion 3a is passed between the rollers 1 and 2 and is pulled over the segment of rope extended between the rollers and out through the cut out 19. When pull is exerted on the free end 3a, the rope is clamped firmly in the gap between the guide rollers as a result of the movement of the roller 2 toward the roller 1 effected by the tension exerted upon the rope. The guide roller 1 is then restrained against rotation while in the clamping position by the insertion of a bolt or screw 7. Tension may be released by removing the section 3b of the rope from the hook 6 allowing the body to pivot in a clockwise direction (FIG. 1) about the axis of the hole 5. When this occurs, the roller 2 moves away from the roller 1 to release the clamping action on the rope passing therebetween.

Figure 4:
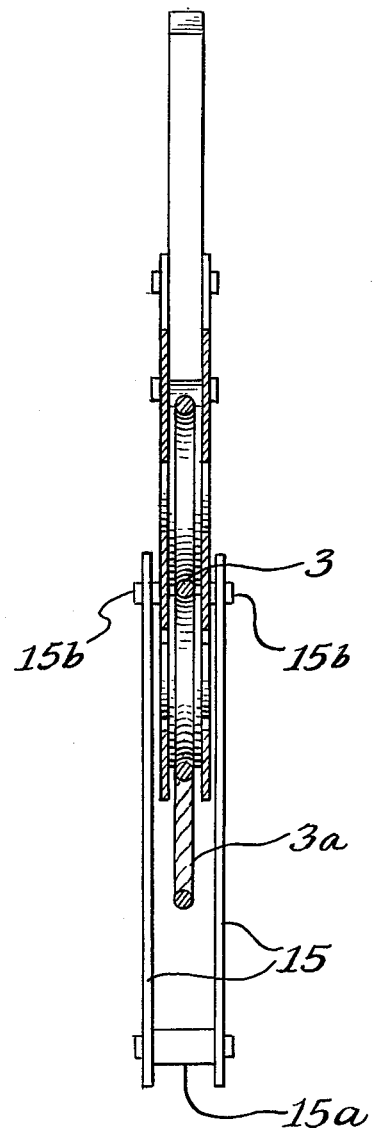

FIG. 3 and 4 show another embodiment of the invention wherein the body 4 is adapted to be attached to a fixed point or anchor by a U-shaped element 14 having flat legs 15. The element 14 is attached to the side members of the body by pins 15b positioned on a line between the guide rollers 1 and 2 and staggered laterally in relation to the axles 12 thereto. As a result of such an arrangement, that is the shifting of the pivotal point of attachment of the body 4 relative to a fixed support point it is possible during movement of the apparatus toward the clamping position to exert a varying tensioning effect upon the rope 3 and thus also to vary the pressing effect of the guide roller 2 against the guide roller 1. By simple manual experiments, the tension and clamping force of the apparatus can be varied so that the force applied to the end 3b of the cable or rope 3 is safe for firmly clamping of the rope or cable 3. The actual tensioning of the cable or rope 3 begins to take place when the apparatus is in a position shown in FIG. 5, with the body 4 pivoted away from the cable portion 3b. In this position, the guide roller 1 is freely rotating so that the rope or cable can be pulled through the apparatus without major resistance until the desired initial tension is attained. Then the base 4 is pivoted in a counterclockwise direction toward the clamping position of FIG. 3 and the hook 6 is secured around the tension cable segment 3b.

Figures 5, 6:
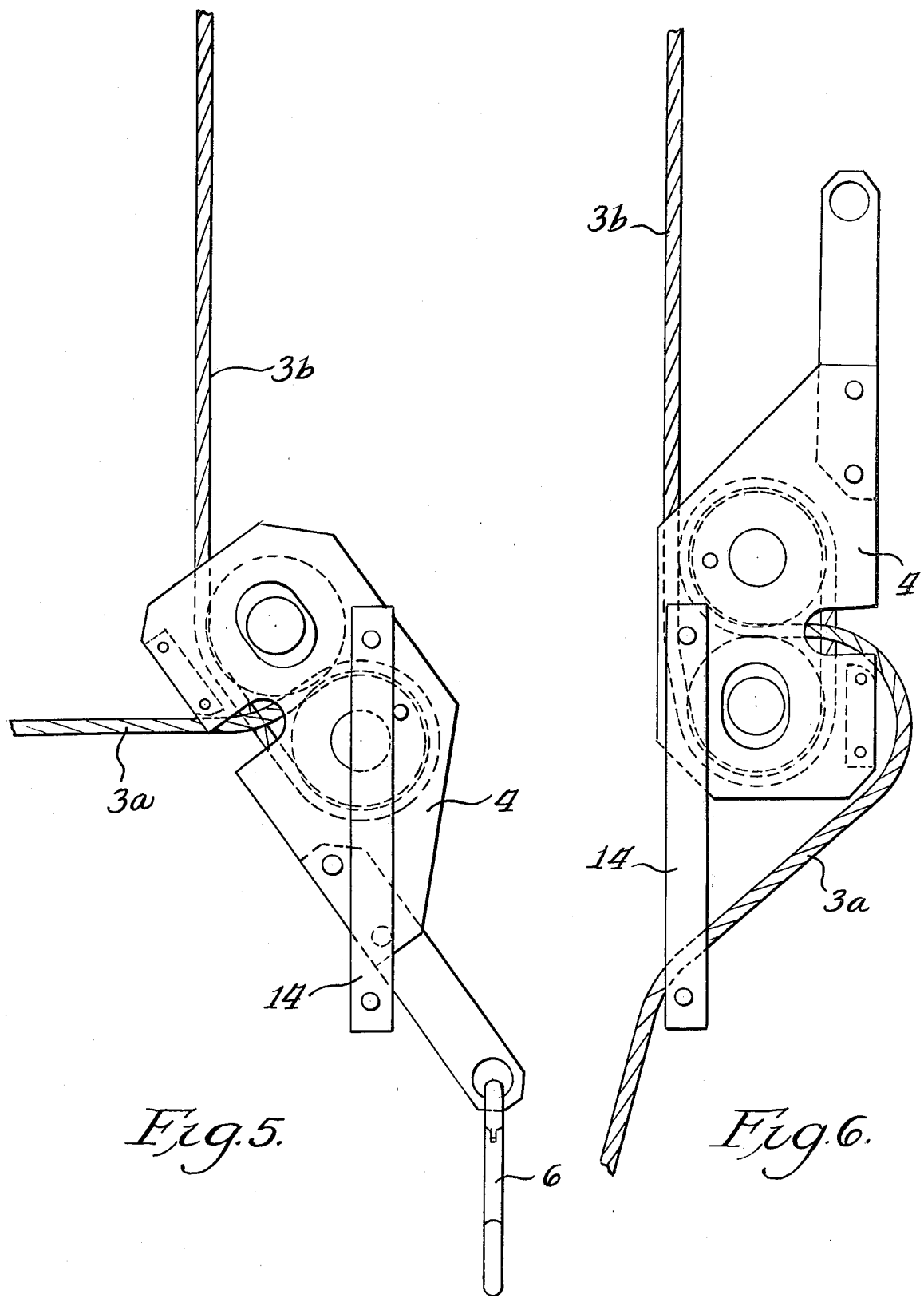

In the embodiment represented in FIGS. 6 and 7, the angle between the body 4 and the element 14 may be fixed at a selected point by means of stop disks 16 and a clamping and screw-type installation, comprising a wing nut 17 and threaded bolt 18. With such an arrangement, it is possible to fix the pivotal position between the body 4 and U-shaped element 14 in any desired angular relation, for example, during the tensioning process shown in FIG. 5, in addition to a fixed clamping position.

An additional embodiment of the invention is shown in FIGS. 8 and 9 wherein the guide roller 1 is provided with a ratchet mechanism 13 for limiting rotation of the roller in one direction. As shown in FIG. 8, the ratchet wheel and a blocking lever engaging teeth on the wheel is biased into contact therewith by a spring. A leaf spring alone could be used as a blocking lever because according to the invention, it is only necessary that the direction of rotation of the guide roller 1 be limited in one direction and that it freely rotate in the opposite direction. Sliding back of the free end 3a of the rope or cable 3 is prevented by the ratchet mechanism and the ratchet mechanism allows for rotation of the guide roller 1 in a tensioning direction freely.

The guide rollers for the rope or cable 3 are preferably formed of iron or steel but may be made of a wide variety of materials. As a further safety feature, sliding of the rope or cable 3 in the guide rollers 1 and 2 may be reduced by a knurling or notches on the roller wheel surfaces engageable with the rope. The knurling or notching should not be so deep, however, that the rope or cable would be damaged. The guide rollers also may be made of plastic or hard rubber and knurled as desired.

The tensioned end 3b of the rope or cable 3 urges the guide roller 2 toward the guide roller 1 to provide a clamping position when the rope is under tension. The relative movement between these two guide rollers 1 and 2 is sufficiently strong so that the rope or cable 3 passing between is clamped and firmly held. The rollers are designed so that flanks do not protrude beyond the rope center line into contact with each other particularly before a firm clamping of the rope or cable is attained.

Advantageously, the diameter of the rope or cable 3 and the dimensions of the treads of the guide rollers 1 and 2 are synchronized with respect to each other and the radius of the rounding of treads of the guide rollers 1 and 2 is slightly larger than the radius of the rope or cable 3. The body 4, finger 9 and U-shaped element 14 are preferably formed of flat sheet material such as an appropriate metal, particularly iron or steel which may be protected against corrosion by paint or galvanizing.

The apparatus according to the invention was used successfully for the tensioning of steel ropes having diameters of 5 and/or 8 mm., and the diameter of the guide rollers 1 and 2 was 50 and/or 60 mm. In an embodiment as shown in FIGS. 3 and 4, it was discovered when a force of 600 kp was applied to the end 3b of the rope 3 that the clamping and guide apparatus of the invention permitted no loosening of the rope 3 during an observation time of 3 days. Thus, it is possible with such an apparatus to safely guide and firmly clamp a wire rope for an adequate span of time without any danger of loosening.

In the embodiment exemplified in the drawings, the body 4 comprised two plates of steel, between which the rope guiding pulleys are mounted. It is possible of course, also to provide side members of the body that are narrow so that opposite edges of both guide rollers are exposed and in this case, the cut out 19 may be dispensed with because the point of intersection between crossing portions of the rope is outside the edges of the side members. The advantage of designing the side members to be wider than the rollers, as shown in the drawings, resides in that capability afforded the spacers 8 to form a limitation for the rope or cable 3 so that the rope is maintained between the side members of the body 4.

In practical applications and experiments with the apparatus according to the invention, it has been found that an advantageous clamping effect is exerted on the rope or cable in the clamping position if and when the holes 5 and/or the pivotal axis of the body 4 is positioned between the shafts 12 of the guide rolls 1 and 2 or even coincides with the shaft 12 of the first guide roll 1. When it is indicated that the holes 5 or pivot axis of the body 4 is between the pulleys or rollers, the pivot point may be on a line directly between the shafts 12 but also may lie between the shafts and shifted laterally as shown in FIG. 3. In that case, the pivot point naturally and advantageously may be the point of pivotal attachment of a U-shaped element 14, to provide additional leverage for exerting tension on the cable when the body is moved toward the clamping position by pivotal movement in a counterclockwise direction. If an extra strong clamping effect is to be exerted on the cable or rope, the pivot axis of the mounting holes 5 that determine the center of gravity may be located at a point further toward the end 3b of the rope or cable 3 that is placed under tension, for example, above the shaft 12 of the first guide roller 1 as shown in the drawings.

Although the present invention has been described with reference to several illustrated embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for guiding and firmly clamping an elongated flexible element such as a rope or cable: said apparatus comprising a body supporting a plurality of rotatively mounted guide rollers for guiding said flexible element aligned in a plane;
   a first of said guide rollers mounted on said body adjacent one end of said flexible element and selectively lockable against rotation in at least one direction relative to said body;
   a second of said guide rollers mounted on said body adjacent another portion of said flexible element that is pulled to provide tension and mounted on said body for movement toward and away from said first guide roller so that said flexible element passing around both guide rollers and between adjacent portions thereof is pressed into a clamped position engaged against both rollers on opposite sides of said element when the second guide roller is moved toward said first guide roller and is released upon movement of said second roller in an opposite direction;
   means for securing said body in a clamping position for securely holding said flexible element; and
   means for securing said body to a fixed point for pivotal movement about said point between said clamping position and a release position comprising a U-shaped element extending outwardly of said body with a pair of legs adjacent opposite sides thereof, said legs being pivotally connected to said body and including means for clamping said legs in a selected rotative position relative to said body.

2. Apparatus for guiding and firmly clamping an elongated flexible element such as a rope or cable, said apparatus comprising a body supporting a plurality of rotatively mounted guide rollers for guiding said flexible element aligned in a plane,
   a first of said guide rollers mounted on said body adjacent one end of said flexible element and selectively lockable against rotation in at least one direction relative to said body,
   a second of said guide rollers mounted on said body adjacent another portion of said flexible element that is pulled to provide tension and mounted on said body for movement toward and away from said first guide roller so that said flexible element passing around both guide rollers and between adjacent portions thereof is pressed into a clamped position when the second guide roller is moved toward said first guide roller and is released upon movement of said second roller in an opposite direction,
   means for securing said body to a point for pivotal movement about said point between a flexible element clamping position and a released position comprising a U-shaped element extending outwardly of said body with a pair of legs adjacent opposite sides thereof,
   said legs of said U-shaped element being pivotally connected to said body and including means for clamping said legs in a selected rotative position relative to said body, and
   means for securing said body in said clamping position.

3. The apparatus as defined in claim 2 wherein said means for securing said body to said point is offset laterally on said body from a line extended between the axes of rotation of said guide rollers in a direction toward a portion of said elongated flexible element that is placed under tension.

4. The apparatus as defined in claim 2, wherein said means for securing said body to said point is connected to said body at a position between said axes of rotation of said guide rollers.

5. The apparatus as defined in claim 2, including removable bolt means for locking said first guide roller against rotation relative to said body.

6. The apparatus as defined in claim 2, including rachet means for limiting rotation of first guide roller to one direction of rotation relative to said body.

7. The apparatus as defined in claim 2 wherein said means for securing said body in said clamping position comprises a hook adapted to engage said portion of said flexible element placed under tension.

* * * * *